United States Patent
Kanda et al.

(10) Patent No.: US 10,237,525 B2
(45) Date of Patent: Mar. 19, 2019

(54) DISPLAY DEVICE, METHOD FOR CONTROLLING DISPLAY DEVICE, CONTROL PROGRAM, AND RECORDING MEDIUM

(71) Applicant: SHARP KABUSHIKI KAISHA, Sakai, Osaka (JP)

(72) Inventors: Takashi Kanda, Sakai (JP); Makoto Hasegawa, Sakai (JP); Yoji Shiraya, Sakai (JP); Shingo Ichikawa, Sakai (JP); Koichi Hirata, Sakai (JP); Yuusuke Hattori, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/753,079

(22) PCT Filed: Dec. 20, 2016

(86) PCT No.: PCT/JP2016/087979
§ 371 (c)(1),
(2) Date: Feb. 15, 2018

(87) PCT Pub. No.: WO2017/110823
PCT Pub. Date: Jun. 29, 2017

(65) Prior Publication Data
US 2018/0241979 A1    Aug. 23, 2018

(30) Foreign Application Priority Data
Dec. 25, 2015    (JP) .................................. 2015-255183

(51) Int. Cl.
*H04N 9/68* (2006.01)
*H04N 5/57* (2006.01)
(Continued)

(52) U.S. Cl.
CPC ................. *H04N 9/68* (2013.01); *G09G 5/00* (2013.01); *G09G 5/36* (2013.01); *H04N 5/202* (2013.01);
(Continued)

(58) Field of Classification Search
CPC .. H04N 9/68; H04N 9/69; H04N 9/64; H04N 5/202; H04N 5/4403; H04N 5/57;
(Continued)

(56) References Cited

U.S. PATENT DOCUMENTS

2009/0189543 A1    7/2009   Yeo et al.
2013/0076974 A1*   3/2013   Atkins ................... H04N 5/235
                                                             348/362
(Continued)

FOREIGN PATENT DOCUMENTS

JP    2009-175740 A    8/2009
JP    2013-182119 A    9/2013
(Continued)

*Primary Examiner* — Sherrie Hsia
(74) *Attorney, Agent, or Firm* — ScienBiziP, P.C.

(57) ABSTRACT

A luminance indicated by an HDR signal is appropriately displayed. A first image processing unit (22) converts, in accordance with a maximum luminance level indicated by an HDR signal input to the first image processing unit (22), a gradation performance indicated by the HDR signal into a prescribed gradation performance according to a display panel (10), and a panel control unit (27) converts, in accordance with the maximum luminance level indicated by the HDR signal and a maximum luminance displayable by the display panel (10), a gradation value indicated by the HDR signal into a gradation value displayable by the display panel (10).

14 Claims, 7 Drawing Sheets

(51) Int. Cl.
*H04N 5/202* (2006.01)
*H04N 5/44* (2011.01)
*G09G 5/00* (2006.01)
*G09G 5/36* (2006.01)
*H04N 5/66* (2006.01)
*H04N 7/01* (2006.01)

(52) U.S. Cl.
CPC .............. *H04N 5/4403* (2013.01); *H04N 5/57* (2013.01); *H04N 5/66* (2013.01); *H04N 7/01* (2013.01)

(58) Field of Classification Search
CPC .......... H04N 11/20; H04N 7/01; H04N 7/012; H04N 5/44
USPC ....... 348/453, 441, 671, 673–675, 687, 678, 348/679
See application file for complete search history.

(56) References Cited

U.S. PATENT DOCUMENTS

| | | |
|---|---|---|
| 2014/0079335 A1 | 3/2014 | Sun |
| 2014/0210847 A1 | 7/2014 | Knibbeler et al. |
| 2014/0225941 A1 | 8/2014 | Van der Vleuten et al. |
| 2015/0009249 A1 | 1/2015 | Kudo et al. |
| 2015/0103919 A1 | 4/2015 | Hattori et al. |
| 2015/0256860 A1 | 9/2015 | Kunkel et al. |
| 2017/0026627 A1 | 1/2017 | Toma et al. |
| 2018/0048845 A1* | 2/2018 | Kozuka .................. H04N 5/57 |

FOREIGN PATENT DOCUMENTS

| | | |
|---|---|---|
| JP | 2014-532195 A | 12/2014 |
| WO | 2015/174026 A1 | 11/2015 |
| WO | 2016/181819 A1 | 11/2016 |

\* cited by examiner

DISPLAY DEVICE, METHOD FOR CONTROLLING DISPLAY DEVICE, CONTROL PROGRAM, AND RECORDING MEDIUM

TECHNICAL FIELD

The present invention relates to a display device compatible with a High Dynamic Range (HDR) technique.

BACKGROUND ART

A High Dynamic Range (HDR) technique is a known function for increasing display image quality. An HDR signal can have luminance information of about 10000 nits ($cd/m^2$). Therefore, using an HDR technique enables an increase in luminance and contrast, which can enhance the impact of video. For example, Blu-ray (registered trademark) Disc adopts the HDR technique.

The luminance displayable by a display device has, however, an upper limit. Even when a signal (HDR signal) generated by the HDR technique is input, the luminance indicated by the HDR signal may be impossible to display.

PTL 1 and PTL 2 each describe a technique for adjusting the luminance of a display device. PTL 1 discloses a technique for adjusting luminance by calculating a typical gradation value of each dimming unit domain in accordance with input image data, generating, with reference to a target gamma curve, a target luminance value corresponding to the typical gradation value which is calculated, and calculating an emission luminance value in each issuance unit block in accordance with the target luminance value.

Moreover, PTL 2 discloses a technique for adjusting the luminance of an OSD image by determining an OSD signal to be output by using gradation data associated with the feature of a video signal to be displayed in a display area of the OSD image.

CITATION LIST

Patent Literature

PTL 1: Japanese Unexamined Patent Application Publication No. 2009-175740 (Publication Date: Aug. 6, 2009).
PTL 2: Japanese Unexamined Patent Application Publication No. 2013-182119 (Publication Date: Sep. 12, 2013).

SUMMARY OF INVENTION

Technical Problem

PTL 1 and PTL 2 fail, however, to propose a solution for a case where luminance displayable by the display device is not compatible with luminance indicated by an HDR signal received by the display device. Thus, in both PTL 1 and PTL 2, when the luminance displayable by the display device is lower than the luminance indicated by the HDR signal received by the display device, the display device cannot display at an appropriate luminance video indicated by the HDR signal input to the display device.

In view of the above problems, it is an object of the present invention to realize a display device capable of appropriately displaying luminance indicated by an HDR signal input to the display device.

Solution to Problem

To solve the problem, a display device according to the present invention is a display device configured to display an image indicated by an HDR signal and an image indicated by an SDR signal, the display device including: a display panel; a panel control unit configured to control the display panel; and a first image processing unit, wherein the first image processing unit is configured to perform gradation performance conversion of converting, in accordance with a maximum luminance level indicated by an HDR signal input to the first image processing unit, a gradation performance indicated by the HDP signal into a prescribed gradation performance according to the display panel, and the panel control unit is configured to perform gradation value conversion of converting, in accordance with the maximum luminance level indicated by the HDR signal and a maximum luminance displayable by the display panel, a gradation value indicated by the HDR signal after the gradation performance conversion into a gradation value displayable by the display panel.

To solve the problem, a display device according to the present invention is a display device configured to display an image indicated by an HDR signal and an image indicated by an SDR signal, the display device including a display panel; a panel control unit configured to control the display panel; a plurality of image processing units; and an image composition unit, wherein the image composition unit is configured to combine image signals output from the plurality of image processing units to obtain a combined image signal and output the combined image signal to the panel control unit, and an image processing unit of the plurality of image processing units which receives the HDR signal converts the gradation performance indicated by the HDR signal into a prescribed gradation performance according to the display panel and converts the prescribed gradation performance into an SDR signal.

To solve the problem, a method for controlling a display device according to the present invention is a method for controlling a display device configured to display an image indicated by an HDR signal and an image indicated by an SDR signal, the display device including a display panel; a panel control unit configured to control the display panel; and a first image processing unit, the method including: performing gradation performance conversion by using the first image processing unit to convert, in accordance with a maximum luminance level indicated by an HDR signal input to the first image processing unit, a gradation performance indicated by the HDR signal into a prescribed gradation performance according to the display panel, and performing gradation value conversion by using the panel control unit to convert, in accordance with the maximum luminance level indicated by the HDR signal and a maximum luminance displayable by the display panel, a gradation value indicated by the HDR signal after the gradation performance conversion into a gradation value displayable by the display panel.

Advantageous Effects of Invention

The present invention enables an HDR signal to have a gradation value compatible with a display panel, and provides the advantage that even when the maximum luminance level indicated by the HDR signal is higher than the luminance displayable by the display panel, the display panel is enabled to display an image indicated by the HDR signal at an appropriate gradation value.

BRIEF DESCRIPTION OF DRAWINGS

FIG. 3 is a view illustrating processes performed by a first image processing unit 22 and a panel control unit 27 of the display device, wherein FIG. 3(a) is a view illustrating the contents of gamma conversion by the first image processing unit 22, and FIGS. 3(b) to 3(d) are views illustrating specific examples of tone mapping executed by the panel control unit 27.

FIG. 4 is a view illustrating a calculation method of gain during superimposing an OSD data, wherein FIG. 4(a) is a diagram of a superimposition circuit, and FIG. 4(b) is a view illustrating a graph for calculating the gain.

FIG. 6 is a view illustrating processes for two-screen display, wherein FIG. 6(a) is a view illustrating the contents of a process by the first image processing unit 22, and FIG. 6(b) is a view illustrating a process by the panel control unit 20.

FIG. 8 is a view illustrating an HDR gamma configuration and tone curves corresponding to the HDR gamma configuration, wherein FIG. 8(a) is a view illustrating the tone curves, and FIG. 8(b) is a view illustrating the relationship between the configuration value of the HDR gamma configuration and a parameter value in a conversion formula.

FIG. 9 is a view illustrating an HDR gamma configuration and tone curves corresponding to the HDR gamma configuration, wherein FIG. 9(a) is a view illustrating the tone curves, and FIG. 9(b) is a view illustrating the relationship between the configuration value of the HDR gamma configuration and a parameter value in a conversion formula.

DESCRIPTION OF EMBODIMENTS

[First Embodiment]

With reference to FIGS. 1 to 6, a display device 1 according to an embodiment of the present invention will be described in detail below. When the display device 1 according to the present embodiment receives a High Dynamic Range (HDR) signal, the display device 1 appropriately controls luminance to be displayed, thereby displaying video without degrading the luminance indicated by the HDR signal.

A current HDR signal adopts an Electro-Optical Transfer Function (EOTF) different from γ2.2 of a conventional SDR signal. Examples of the EOTF include an EOTF defined in accordance with SMPTE-ST2084. Note that in the following description, the EOTF defined in accordance with the SMPTE-ST2084 of the HDR signal is referred to as a ST2084 signal.

Since the gamma curve of the ST2084 signal has a shape different from that of γ2.2, the ST2084 signal cannot be appropriately displayed by a display device compatible with the conventional γ2.2 (a display device compatible with the SDR signal).

Moreover, causing a conventional display device compatible with the SDR signal to be compatible with not only the SDR signal but also the ST2084 signal involves various problems, for example, addition of an adjustment step.

Thus, in the present embodiment, the ST2084 signal is converted into γ2.2 so that the ST2084 signal can be displayed without adding an adjustment step even when a display device is compatible with the SDR signal.

Moreover, the ST2084 signal includes luminance information up to 10000 cd/m$^2$, but no display device which enables such a high luminance to be displayed is currently available. Thus, the present embodiment performs mapping (tone mapping) of the HDR signal within a luminance range displayable by the display device to enable the display device to appropriately display the luminance (gradation) indicated by the ST2084 signal.

Note that the present embodiment describes but is not limited to an example in which the HDR signal is the ST2084 signal (adopts the EOTF defined in accordance with the SMPTE-ST2084). Any HDR signal may be used, and the standard with which the HDR signal is compatible is not limited.

[Exterior of Display Device 1]

Figure 2:
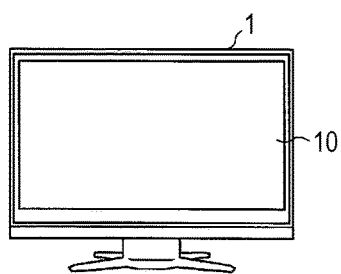
FIG. 2 is a view illustrating the exterior of the display device.

First, with reference to FIG. 2, the exterior of the display device 1 will be described. FIG. 2 is a view illustrating the exterior of the display device 1. As illustrated in FIG. 2, the display device 1 is a so-called television set configured to display, on a display panel 10, television broadcast indicated by a received Tuner signal 12 (a signal received by a tuner). Moreover, the display device 1 may receive a High-Definition Multimedia Interface (HDMI) (registered trademark) signal 11 based on the HDMI standard to display video or receive a Composite Video, Blanking, and Sync (CVBS) signal 13 to display video.

Note that in the present embodiment, a television set is described as an example of the display device 1, but the present invention is not limited to this example, and any display device may be used as long as the display device is configured to display video.

[Details of Display Device 1]

Figure 1:
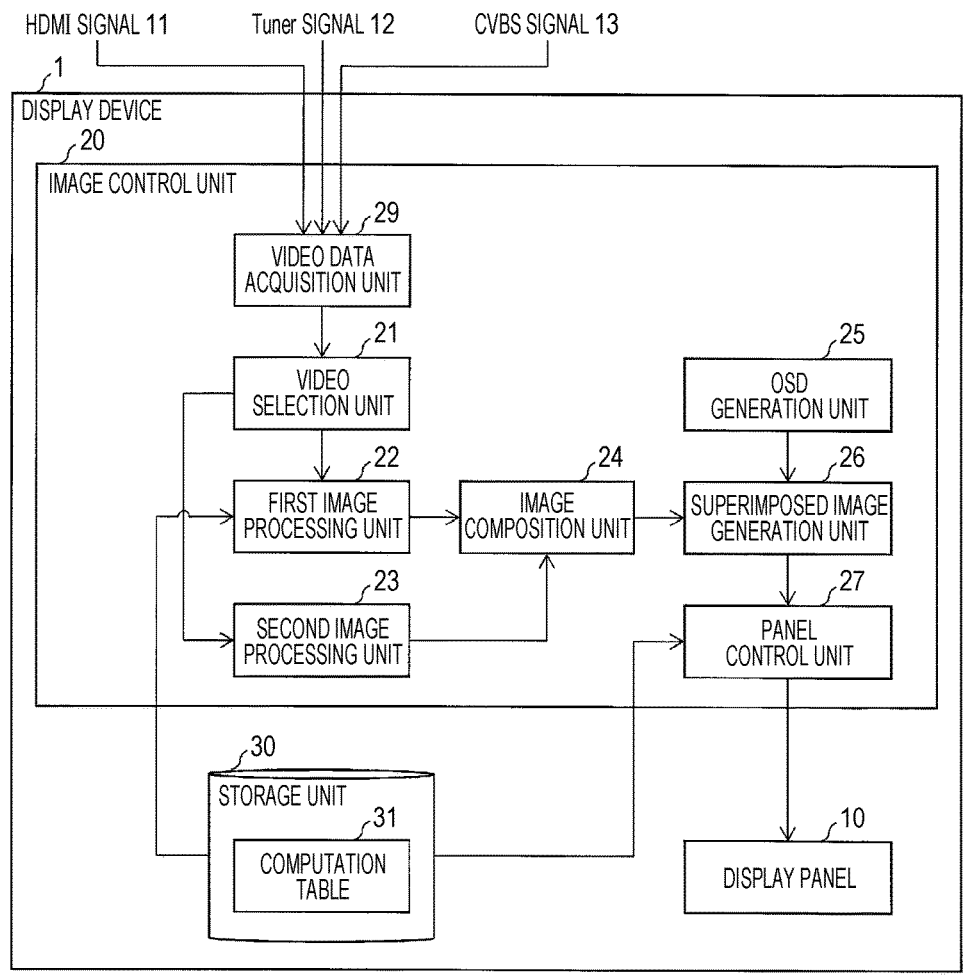
FIG. 1 is a block diagram illustrating main components of a display device according to an embodiment of the present invention.

Next, with reference to FIG. 1, details of the display device 1 will be described. FIG. 1 is a block diagram illustrating main components of the display device 1. As illustrated in FIG. 1, the display device 1 according to the present embodiment includes the display panel 10, an image control unit (display control unit) 20, and a storage unit 30.

The display panel 10 is a display device that displays video and the like, and any display device may be used as long as the display device can display information. Specific examples of the display device include a liquid crystal display, an organic Electro Luminescence (EL) display, and a plasma display.

The image control unit 20 adjusts the luminance to be displayed by the display panel 10 depending on whether or not a received video signal is the HDR signal, and the image control unit 20 executes various processes of the display device 1. As illustrated in FIG. 1, the image control unit 20 includes a video data acquisition unit 29, a video selecting unit 21, a first image processing unit 22, a second image processing unit 23, an image composition unit 24, an On Screen Display (OSD) generation unit 25, a superimposed image generation unit 26, and a panel control unit 27.

The video data acquisition unit 29 receives at least one of an HDMI signal 11, the Tuner signal 12, and a CVBS signal 13 and transmits the signal to the video selecting unit 21. Note that when it is not necessary to distinguish the HDMI signal 11, the Tuner signal 12, and the CVBS signal 13 from one another, these signals are referred to as video signals. The video signal which the video data acquisition unit 29 receives includes data indicating whether or not the video signal is an HDR signal and data indicating "MAX CLL" and "MAX FALL" in addition to video data which will be described later.

The video selecting unit 21 determines whether or not the HDMI signal 11, the Tuner signal 12, and the CVBS signal 13 received from the video data acquisition unit 29 are HDR signals or Standard Dynamic Range (SDR) signals to obtain a determination result, and based on the determination result, the video selecting unit 21 transmits the video signals, which the video selecting unit 21 receives, to the first image processing unit 22 or the second image processing unit 23. For example, when the video signals which the video selecting unit 21 receives are video signals including the HDR signals, the video selecting unit 21 transmits the video signals to the first image processing unit 22, and when the video signals which the video selecting unit 21 receives are video signals including the SDR signals, the video selecting unit 21 transmits the video signals to the second image processing unit 23.

Determination of whether or not the video signals are the HDR signals can be made with reference to, for example, the EOTF of an INFO FRAME of the HDMI signal.

Moreover, in a method conforming to the HEVC standard, the determination can be made with reference to transfer_characteristics of a VUI parameter included in a sequence parameter set.

Moreover, when MMT is used as a multiplexing method of advanced BS digital broadcasting, the determination can be made with reference to video_transfer_characteristics included in a Video_Component_Descriptor included in an MMT Package Table (MPT) stored in a PA message of an MMT-SI message. Alternatively, the determination can be made with reference to video_transfer_characteristics included in a Video_Component_Descriptor included in an MH-Evnet Information Table (MH-EIT) [schedule actual basic] stored in an M2 section message of the MMT-SI message.

Moreover, in a case of an MPEG-2TS method, the determination can be made with reference to transfer characteristics of a video decode control descriptor.

As described above, in the present embodiment, the video data acquisition unit 29 acquires video data including HDR signal determination data, which is data for determining whether or not the video signal is the HDR signal. The video selecting unit 21 includes an HDR signal determination data acquisition unit configured to acquire the HDR signal determination data from the video data which the video data acquisition unit 29 acquires. With reference to the HDR signal determination data acquired by the HDR signal determination data acquisition unit, the video selecting unit 21 determines whether or not the video signal is the HDR signal.

Note that the HDR signal determination data is, for example, the EOTF of an INFO FRAME of the HDMI signal, the transfer_characteristics of the VUI parameter included in the sequence parameter set, the video_transfer_characteristics included in the Video_Component_Descriptor, which is one descriptor of the time direction hierarchical coding HEVC, or the transfer_characteristics of the video decode control descriptor, which is described above.

Figure 3:
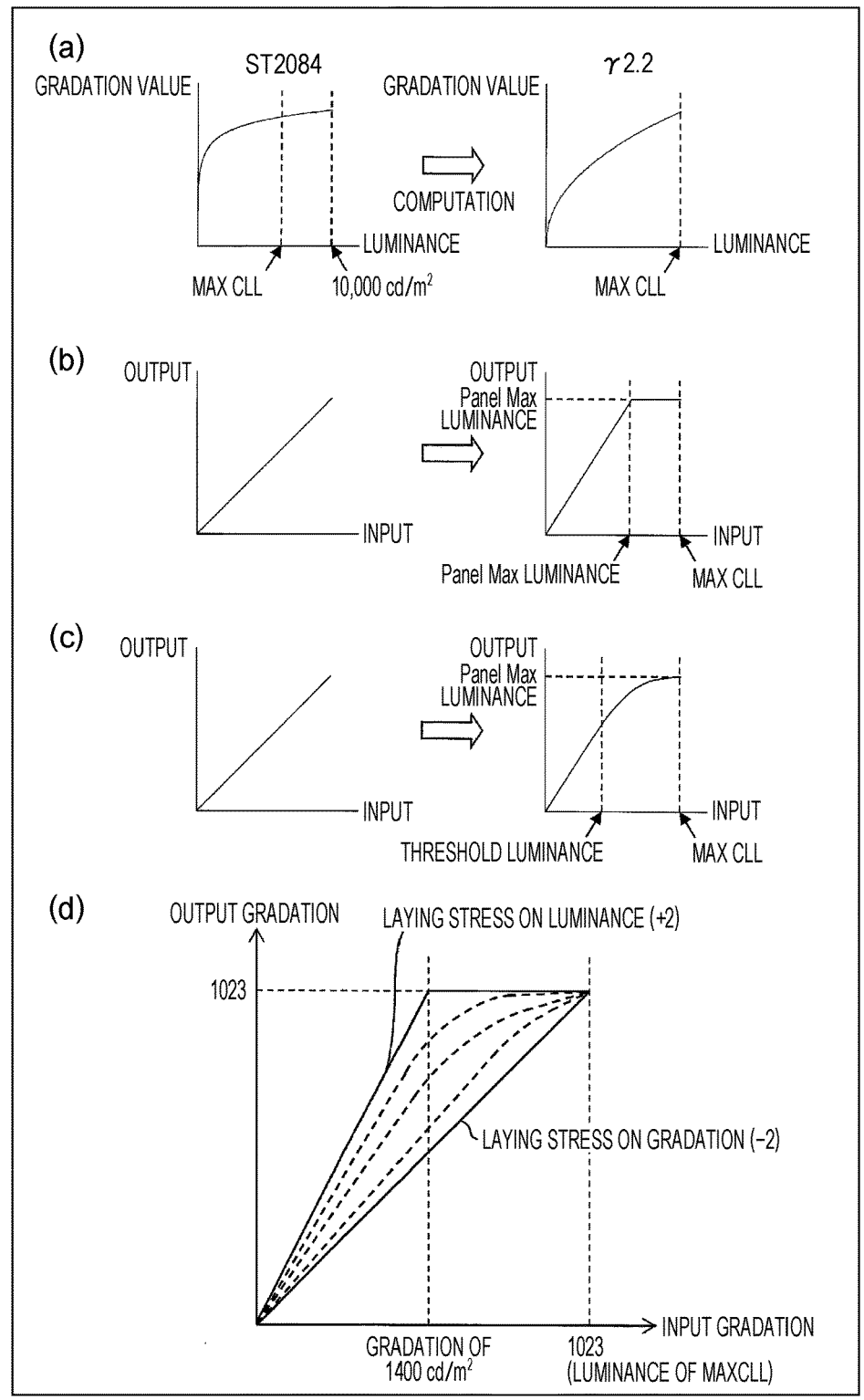

The first image processing unit 22 converts (performs gamma conversion of) a signal (ST2084 signal) of SMPTE Standard ST2084 conforming to the standard of HDR into a signal of γ2.2 (gamma correction with a gamma value of 2.2). The gamma conversion will be described in detail with reference to FIG. 3(a). FIG. 3 is a view illustrating processes performed by a first image processing unit 22 and a panel control unit 27, wherein FIG. 3(a) is a view illustrating the contents of gamma conversion by the first image processing unit 22. FIG. 3(a) shows the ST2084 signal which is input on the left. Here, the horizontal axis denotes luminance, and the vertical axis denotes gradation values. As illustrated in FIG. 3(a), the luminance of the ST2084 signal has values up to 10000 cd/m$^2$. Moreover, the Maximum Content Light Level (MAX CLL) on the horizontal axis shows the largest luminance value of a predetermined unit (e.g., one scene) of the contents. The first image processing unit 22 cuts the ST2084 signal shown on the left in FIG. 3(a) at a luminance of MAX CLL and assigns luminance values from 0 to MAX CLL to γ2.2 (on the right in FIG. 3(a)), thereby performing the gamma conversion. Thus, using the part of the ST2084 signal corresponding to the luminance values from MAX CLL to 10000 cd/m$^2$ enables unnecessary loss of gradation to be prevented.

This embodiment describes that the gamma conversion is performed with reference to MAX CLL, but instead of MAX CLL, Maximum Frame-average Light Level (MAX FALL) may be used to perform the gamma conversion. Moreover, MAX CLL and MAX FALL are stored in metadata included in, for example, an INFO FRAME of the HDMI signal.

As described above, the first image processing unit 22 performs gradation performance conversion (gamma conversion) of converting, in accordance with the maximum luminance level (MAX CLL or MAX FALL) indicated by the HDR signal input to the first image processing unit 22, a gradation performance indicated by the HDR signal into a prescribed gradation performance (gamma 2.2) according to the display panel 10.

The second image processing unit 23 performs processing of the SDR signal. Note that since the processing of the SDR signal can be performed by a known technique, the detailed description thereof is omitted.

When both the first image processing unit 22 and the second image processing unit 23 perform the processes, the image composition unit 24 consolidates a result of the process performed by the first image processing unit 22 and a result of the process performed by the second image processing unit 23 into a single video signal.

The OSD generation unit 25 generates OSD data for OSD display and transmits the OSD data to the superimposed image generation unit 26.

Figure 4:
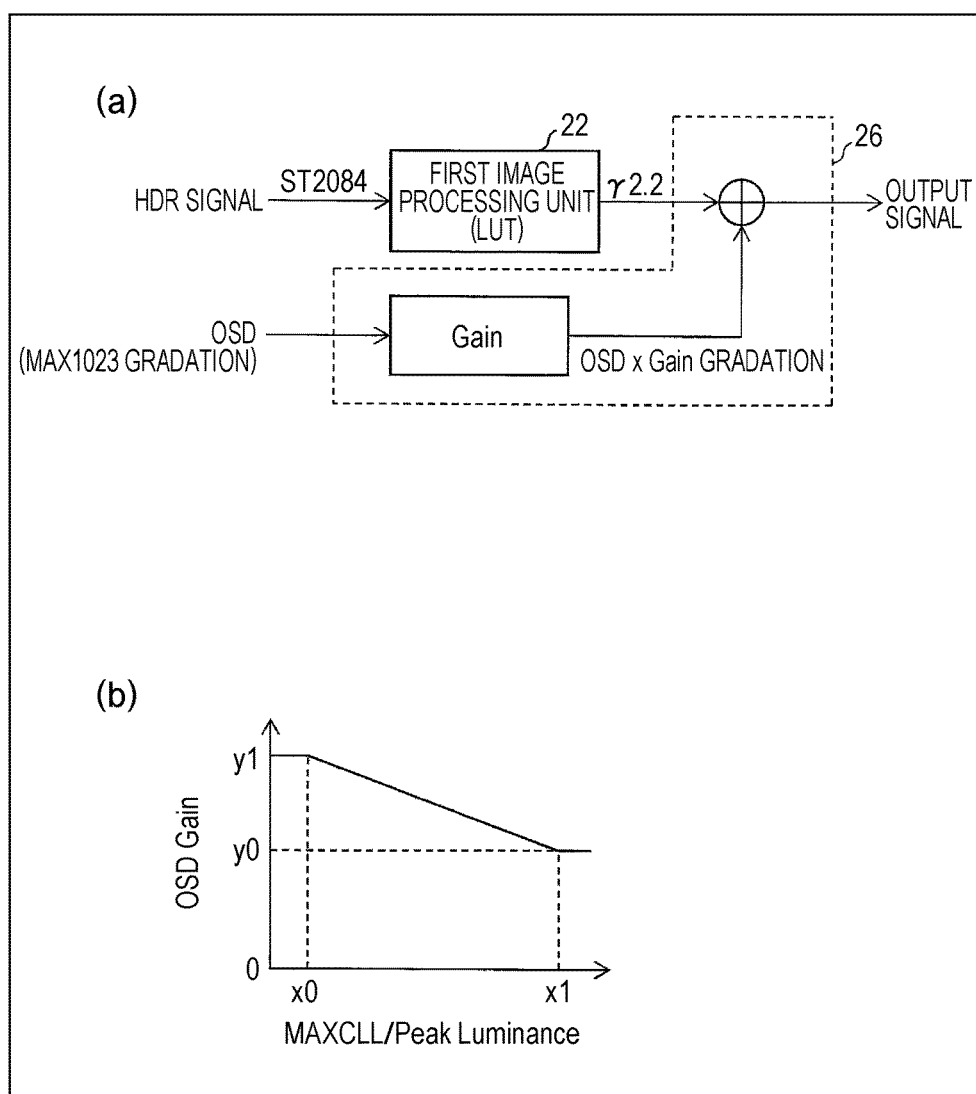

The superimposed image generation unit 26 superimposes the OSD data (a superimposition target image) transmitted from the OSD generation unit 25 over the video signal (input signal) received from the image composition unit 24. When a character of the OSD is expressed as a white character, the character is white with a gradation value of 255 based on the SDR. In contrast, when a character of the OSD which is white with a gradation value of 255, as in the case of the SDR, is superimposed based on the HDR, the character is expressed unnecessarily brightly. Thus, the superimposed image generation unit 26 includes a gain adjustment unit, and during HDR display, the superimposed image generation unit 26 uses, for example, MAX CLL of the video signal received from the image composition unit 24 to calculate gain and multiply the OSD gradation by the gain, thereby ensuring that the OSD (displaying the character) during HDR has the same luminance (gradation level) as that when displaying the character in SDR. A more specific description will be given with reference to FIGS. 4 and 5. FIG. 4 is a view illustrating a calculation method of gain during superimposing an OSD data, wherein FIG. 4(a) is a diagram of a superimposition circuit, and FIG. 4(b) is a view illustrating a graph for calculating the gain. As illustrated in FIG. 4(a), the OSD data expressed by 1023 gradations is multiplied by the gain to obtain a resultant, and the resultant is superimposed on a signal obtained by the gamma conversion of the ST2084 signal (in FIG. 4(a), conversion by referring to a Look Up Table (LUT) is shown) to obtain an output signal.

The gain by which the OSD data is multiplied is derived in accordance with the ratio of MAX CLL to Peak Luminance. In this embodiment, Peak Luminance refers to the maximum display luminance of the display panel 10. An example of a deriving method will be described with reference to FIG. 4(b). In FIG. 4(b), gain (OSD Gain) is shown on the vertical axis, and the ratio of MAX CLL to Peak Luminance (MAX CLL/Peak Luminance) is shown on the horizontal axis.

As illustrated in FIG. 4(b), the gain (OSD Gain) is determined as follows: when (MAXCLL/PEAK Luminance)≤x0, OSD Gain=y1, when x0<(MAXCLL/PEAK Luminance)≤x1, OSD Gain=A×(MAXCLL/PEAK Luminance)+B, and when x1<(MAXCLL/PEAK Luminance), OSD Gain=y0.

The panel control unit 27 performs tone mapping of the video signal received from the superimposed image generation unit 26, thereby enabling the video signal to be displayed at an appropriate luminance by the display panel 10. The tone mapping determines assignment of luminance information included in the video signal to luminance which can be expressed by the display panel 10. The tone mapping may be performed by storing a plurality of patterns of tone maps in the storage unit 30 which will be described later and by causing a user to select an appropriate tone map, or the tone mapping may be performed by using a Look Up Table (LUT) or a formula (a prescribed computation). The tone map shows a correspondence relationship between the gradation values indicated by the HDR signal and the gradation values displayable by the display panel 10.

That is, tone mapping is conversion of the luminance information with reference to a tone map (tone curve). The tone map (tone curve) is a trajectory showing the relationship between the luminance information before the conversion and the luminance information after the conversion (a map with the horizontal axis representing the luminance information before the conversion and the vertical axis representing the luminance information after the conversion).

With reference to FIGS. 3(b), 3(c), and 3(d), a specific example of the tone mapping performed by the panel control unit 27 will be described.

When the value of MAX CLL is larger than the maximum luminance that can be expressed by the display panel 10, the display panel 10 cannot express all the luminance values included in the video signal. Thus, in the example shown in FIG. 3(b), the luminance of the video signal is expressed as is up to the maximum luminance that can be expressed by the display panel 10, and a portion of the luminance of the video signal higher than the maximum luminance that can be expressed by the display panel 10 is subjected to the tone mapping so that the portion can be displayed at the maximum luminance that can be expressed by the display panel 10. Thus, the gradation of a high-luminance part of the video signal is lost, but the luminance of the video signal can be expressed as accurately as possible.

Moreover, the tone mapping maybe performed to prevent the gradation of the high-luminance part of the video signal from being lost. In the example shown in FIG. 3(c), the luminance of the video signal is expressed as is (expressed linearly) up to a prescribed luminance (luminance threshold value), and the luminance higher than the prescribed luminance (in other words, above the luminance threshold value) is mapped to draw a smooth curve such that MAX CLL eventually coincides with the maximum luminance that can be expressed by the display panel 10. Note that the prescribed luminance is determined based on at least a luminance of the video signal up to which the gradation is actually expressed. Thus, the gradation of the high-luminance part of the video signal is not lost, but the luminance of the video signal can be expressed as actually as possible.

FIG. 3(d) shows a specific example of the tone mapping including the examples shown in FIGS. 3(b) and 3(c). Note that in this embodiment, the gradation is expressed in 1023 gradations (the gradation indicating MAX CLL is 1023).

When the luminance corresponding to the gradation of 1400 cd/m$^2$ shown in FIG. 3(d) corresponds to the maximum luminance that can be expressed by the display panel 10, the graph indicated by "laying stress on luminance (+2)" corresponds to the tone curve for performing the tone mapping show in FIG. 3(b). Moreover, one of the tone curves indicated by broken lines corresponds to the tone curve for performing the tone mapping shown in FIG. 3(c). The tone curve shown in the graph shown by laying stress on gradation (−2) shown in FIG. 3(d) is an example of the tone mapping of a case where stress is laid on the gradation of the video signal. In this case, the gradation of the video signal is expressed, but the luminance of the video signal cannot be expressed accurately, resulting in video which is slightly dark (with low luminance).

As described above, the panel control unit 27 is configured to perform gradation value conversion (tone mapping) of converting, in accordance with the maximum luminance level (MAX CLL or MAX FALL) indicated by the HDR signal and a maximum luminance displayable by the display panel 10, a gradation value (luminance) indicated by the HDR signal after the gradation performance conversion (gamma conversion) into a gradation value (luminance) displayable by the display panel 10.

The storage unit 30 stores information and includes a nonvolatile device, such as flash memory or Read Only Memory (ROM), and a volatile device, such as Random Access Memory (RAM). Examples of contents stored in the nonvolatile device include various programs, various operation configuration values, and various types of data. Examples of contents stored in the volatile device include files for work and temporary files. In the present embodiment, the storage unit 30 includes a computation table 31.

Moreover, the storage unit 30 may store a plurality of patterns of tone maps as described above.

The computation table 31 is a table used for the gamma conversion process executed by the first image processing unit 22 and the tone mapping computation executed by the panel control unit 27.

[Flow of Processes in Display Device 1]

Figure 5:
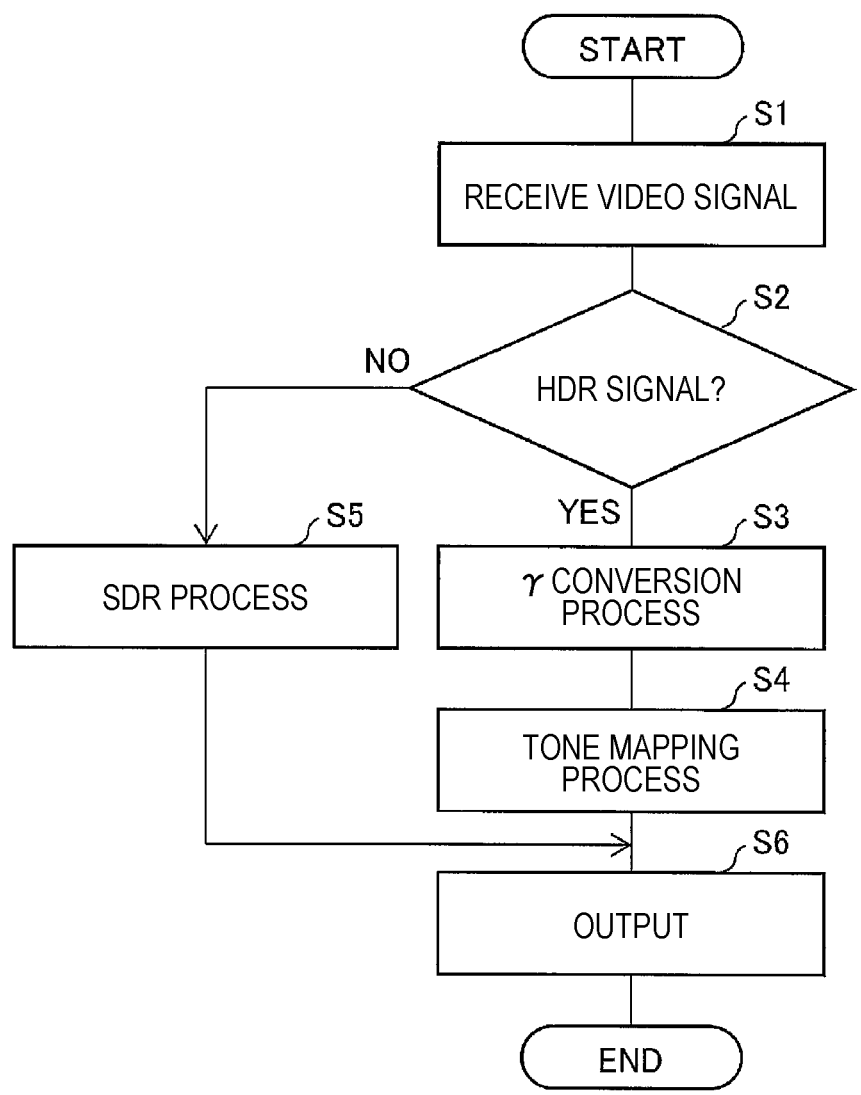
FIG. 5 is a flowchart illustrating a flow of processes performed by the display device.

Next, with reference to FIG. 5, a flow of processes performed by the display device 1 will be described. FIG. 5 is a flow chart showing a flow of processes performed by the display device 1. As illustrated in FIG. 5, when the display device 1 receives a video signal (S1), the video selecting unit 21 determines whether or not the video signal received by the display device 1 includes an HDR signal (S2), and if the video signal includes the HDR signal (YES in S2), the video selecting unit 21 transmits the video signal to the first image processing unit 22. Then, the first image processing unit 22 performs the gamma conversion process of the video signal (HDR signal) received by the display device 1 (S3). Thereafter, the video signal after the gamma conversion process is transmitted to the panel control unit 27, and a tone mapping process is executed by the panel control unit 27 (S4). The video signal after the tone mapping process is then output to the display panel 10 (S6).

On the other hand, if it is determined in step S2 that the video signal received by the display device 1 does not include the HDR signal (i.e., includes an SDR signal) (NO in S2), the video selecting unit 21 transmits the video signal (SDR signal) received by the display device 1 to the second image processing unit 23. Then, the second image processing unit 23 performs processing of the SDR signal (S5). Thereafter, the video signal after the processing of the SDR signal is output to the display panel 10 (S6).

The flow of the processes performed by the display device 1 is as described above.

[Second Embodiment]

Next, another embodiment of the present invention will be described below with reference to FIG. 6. Note that for the sake of description, members having the same functions as those described in the embodiment described above are denoted by the same reference numbers, and the description thereof will be omitted.

The present embodiment describes a process method in a case of receiving two video signals which are a video signal (image signal) including an HDR signal and a video signal (image signal) including an SDR signal, that is, a case of two-screen display for displaying two video signals which are an HDR signal and an SDR signal. If the process by the panel control unit 27 can be performed only to the entirety of the screen in the case of the two-screen display for displaying the two video signals, which are the HDR signal and the SDR signal, the quality of video of the HDR signal or video of the SDR signal degrades. Thus, in the present embodiment, the HDR signal is converted into the SDR signal to perform a process based on the SDR signal on the entirety of the screen so as to prevent degradation in quality of the video.

Figure 6:
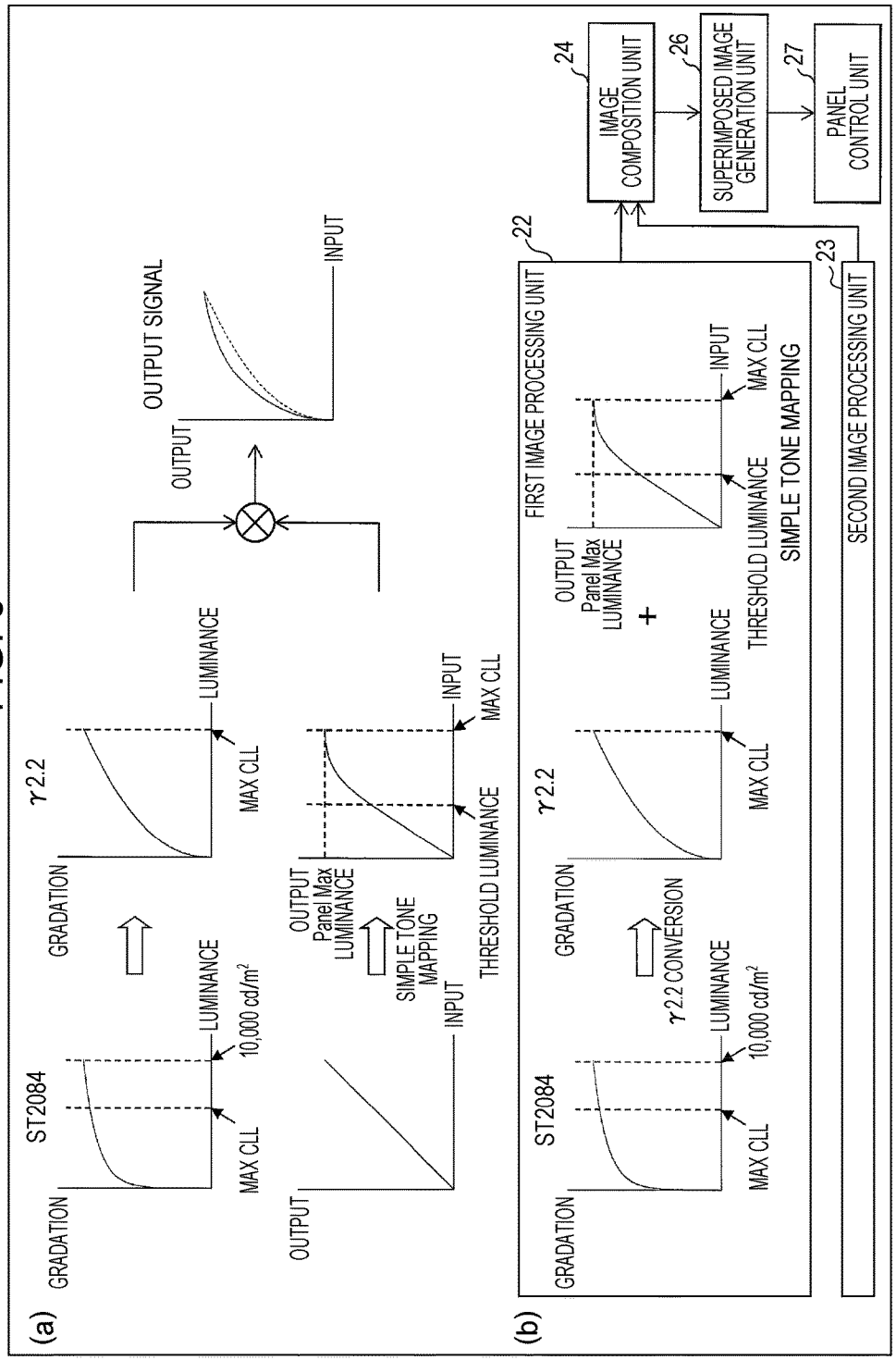

FIG. 6 is a view illustrating processes for the two-screen display, wherein FIG. 6(*a*) is a view illustrating the contents of a process by the first image processing unit 22, and FIG. 6(*b*) is a view illustrating a process by the panel control unit 20.

As described in the first embodiment, in a case of one screen for the HDR signal, the first image processing unit 22 only executes the gamma conversion process. However, in the present embodiment, as illustrated in FIG. 6(*a*), the first image processing unit 22 performs simple tone mapping by the panel control unit 27 in addition to the gamma conversion process and consolidates the result of the gamma conversion and the result of the simple tone mapping to generate an output signal. That is, the result of the gamma conversion is not output as is, but an output obtained by reflecting the result of the simple tone mapping by the result of the gamma conversion is output. In the output signal shown in FIG. 6(*a*), the tone curve indicated by a broken line shows a case where only the gamma conversion is performed, and the tone curve indicated by the solid line shows a case where the result of the simple tone mapping consolidated with the result of the gamma conversion.

Here, the simple tone mapping does not mean that the maximum luminance that can be expressed by the display panel 10 is varied depending on video scenes indicated by the video signal, but the simple tone mapping means that the tone mapping is performed by a value configured in advance.

Thus, the video signal which the first image processing unit 22 outputs is similar to the SDR signal.

Then, when the video signal output from the first image processing unit 22 becomes the SDR signal, the video signal output from the first image processing unit 22 and the video signal output from the second image processing unit 23 both are SDR signals as illustrated in FIG. 6(*b*). Thus, the panel control unit 27 processes, as SDR signals, the video signals which are acquired via the image composition unit 24 and the superimposed image generation unit 26 and which are output from the first image processing unit 22 and the second image processing unit 23, and the panel control unit 27 outputs the video signals to the display panel 10. Thus, both the video signal including the HDR signal and the video signal including the SDR signal can be displayed in two screens. Note that it can be said that in the present embodiment, video signals are displayed by being unified into the SDR signal.

[Third Embodiment]

Another embodiment of the present invention will be described below. Note that for the sake of description, members having the same functions as those described in the embodiment described above are denoted by the same reference numbers, and the description thereof will be omitted.

Similarly to the second embodiment, the present embodiment describes a process method in a case of receiving two video signals which are a video signal including an HDR signal and a video signal including an SDR signal, that is, a case of two-screen display for displaying two video signals which are an HDR signal and an SDR signal. In the second embodiment, the configuration in which video signals are displayed by being unified into the SDR signal is described, but in the present embodiment, the video signals are displayed by being unified into the HDR signal.

In the present embodiment, a panel control unit 27 performs inverse tone mapping on an SDR signal received from a second image processing unit 23 such that the SDR signal becomes a video signal similar to the HDR signal. Then, the panel control unit 27 outputs to the display panel 10 a video signal including an HDR signal received from a first image processing unit 22 and the video signal which includes a signal corresponding to the HDR signal and which is obtained by converting the video signal including the SDR signal received from a second image processing unit 23. Thus, both the video signal including the HDR signal and the video signal including the SDR signal can be displayed in two screens.

Note that the inverse tone mapping (inverse conversion of the gradation value conversion) means converting the tone curve of the SDR signal into the tone curve of the HDR signal.

[Fourth Embodiment]

Still another embodiment of the present invention will be described below with reference to FIGS. 7 to 9. Note that for the sake of description, members having the same functions as those described in the embodiment described above are denoted by the same reference numbers, and the description thereof will be omitted.

The present embodiment includes a user interface (UI) with which a user selects a degree to which the luminance indicated by an HDR signal is reflected by the display. Including the user interface enables a video signal including the HDR signal to be displayed at luminance desired by the user.

Figure 7:
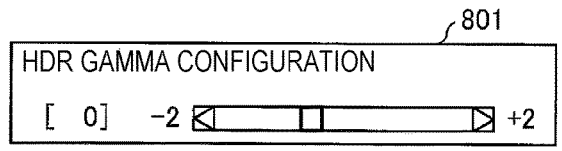
FIG. 7 is a view illustrating an example of a user interface.

FIG. 7 is a view illustrating an example of the user interface. In the present embodiment, as illustrated in FIG. 7, a video configuration screen has an input area 801 of the HDR gamma configuration to receive an HDR gamma configuration. In this embodiment, the HDR gamma configuration is received by five stages from "−2" to "+2". Note that FIG. 7 shows an example in which the HDR gamma configuration is received by a slide bar, but the embodiment is not limited to the slide bar, and the HDR gamma configuration may be received via, for example, a radio button or the like.

Note that the user interface may be configured to display the video signal only when the video signal input to the display device 1 is the HDR signal. With this configuration, the user interface can be displayed only when needed. Moreover, when a signal other than the HDR signal is input, the user interface is displayed by being hatched.

Moreover, when the video signal which is input to the display device 1 (signal to be displayed) is not the HDR signal, configuration items of a menu may be grayed out, or a mark denoting that operation is forbidden (e.g., a sign of parking prohibition, a no-entry sign) is displayed, so that a user can understands at a glance that the operation is not possible.

[Fifth Embodiment]

Next, with reference to FIGS. 8 and 9, a variation of the tone mapping will be described. Each of FIGS. 8 and 9 is a view illustrating an HDR gamma configuration and tone curves corresponding to the HDR gamma configuration, wherein FIGS. 8(*a*) and 9(*a*) are views illustrating the tone curves, and FIGS. 8(*b*) and 9(*b*) are views illustrating the relationship between the configuration values of the HDR gamma configuration and parameter values in a conversion formula.

Tone mapping executed by the panel control unit 27 may be performed based on a graph itself, by referring to a conversion table, or in accordance with a conversion formula.

An example of the conversion formula is shown below.
When $0 \le x \le X1$, $$y=\{(1-\alpha)\ (Y1/X2)+\alpha(Y1/X1)\}x$$

When $X1 \le x \le X2$, $$y=(1-\alpha)\ (Y1/X2)x+\alpha Y1$$

Figure 8:
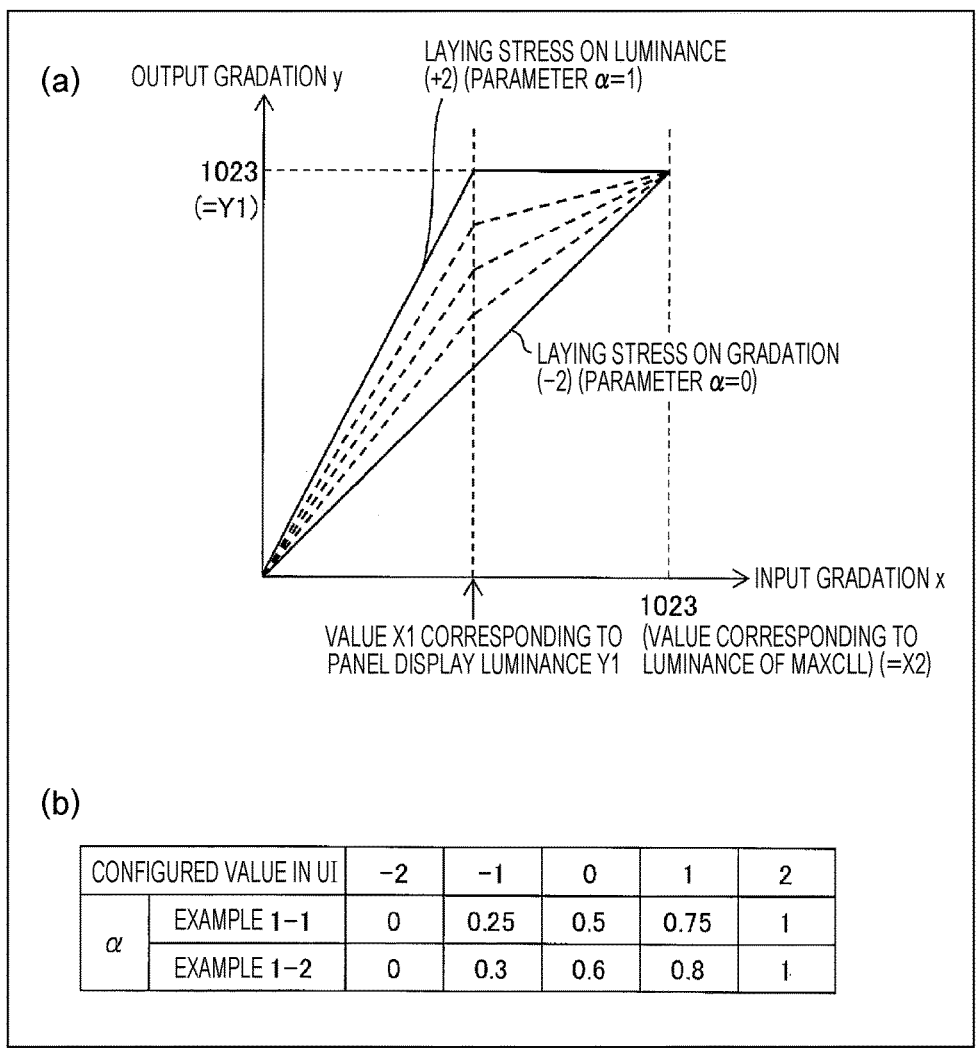

FIG. 8(*a*) shows an example of tone curves when conversion is performed in accordance with the formula. Note that the value of $\alpha$ varies depending on an HDR gamma configuration value received with the user interface described in the fourth embodiment. FIG. 8(*b*) shows the relationship between the HDR gamma configuration value and the value of $\alpha$.

In FIG. 8(*b*), Example 1-1 and Example 1-2 are shown. In Example 1-1, when the HDR gamma configuration value is "−2", $\alpha$ is "0", when the HDR gamma configuration value is "−1", $\alpha$ is "0.25", . . . Moreover, in Example 1-2, when the HDR gamma configuration value is "−2", $\alpha$ is "0", when the HDR gamma configuration value is "−12", $\alpha$ is "0.3", . . . The same follows hereafter.

As illustrated in FIG. 8(*b*), when the HDR gamma configuration value is "+2", the value of $\alpha$ is "1", and therefore, the tone curve at this time corresponds to the graph shown by laying stress on luminance (+2) (parameter $\alpha$=1) in FIG. 8(*a*). Moreover, when the HDR gamma configuration value is "+1", the value of $\alpha$ is "0.75" (in the case of Example 1-1), and the tone curve at this time corresponds to the uppermost one of the graphs shown in broken lines in FIG. 8(*a*). The same follows hereafter.

Another example of the conversion formula is shown below.
When $0 \le x \le X0$, $$y=(Y1/X1)x$$

When $X0 \le x \le X1$, $$y=\{(1-\alpha)\ (Y1/X1)\ (X1-X0)/(X2-X0)+\alpha(Y1/X1)\}x+\\Y1X0/X1-\{(1-\alpha)\ (Y1/X1)\ (X1-X0)/(X2-X0)+\alpha\\(Y1/X1)\}X0$$

When $X1 \le x \le X2$ $$y=\{(1-\alpha)\ (Y1/X1)\ (X1-X0)/(X2-X0)\}x+Y1-\{(1-\alpha)\\(Y1/X1)\ (X1-X0)/(X2-X0)\}X2$$

Figure 9:
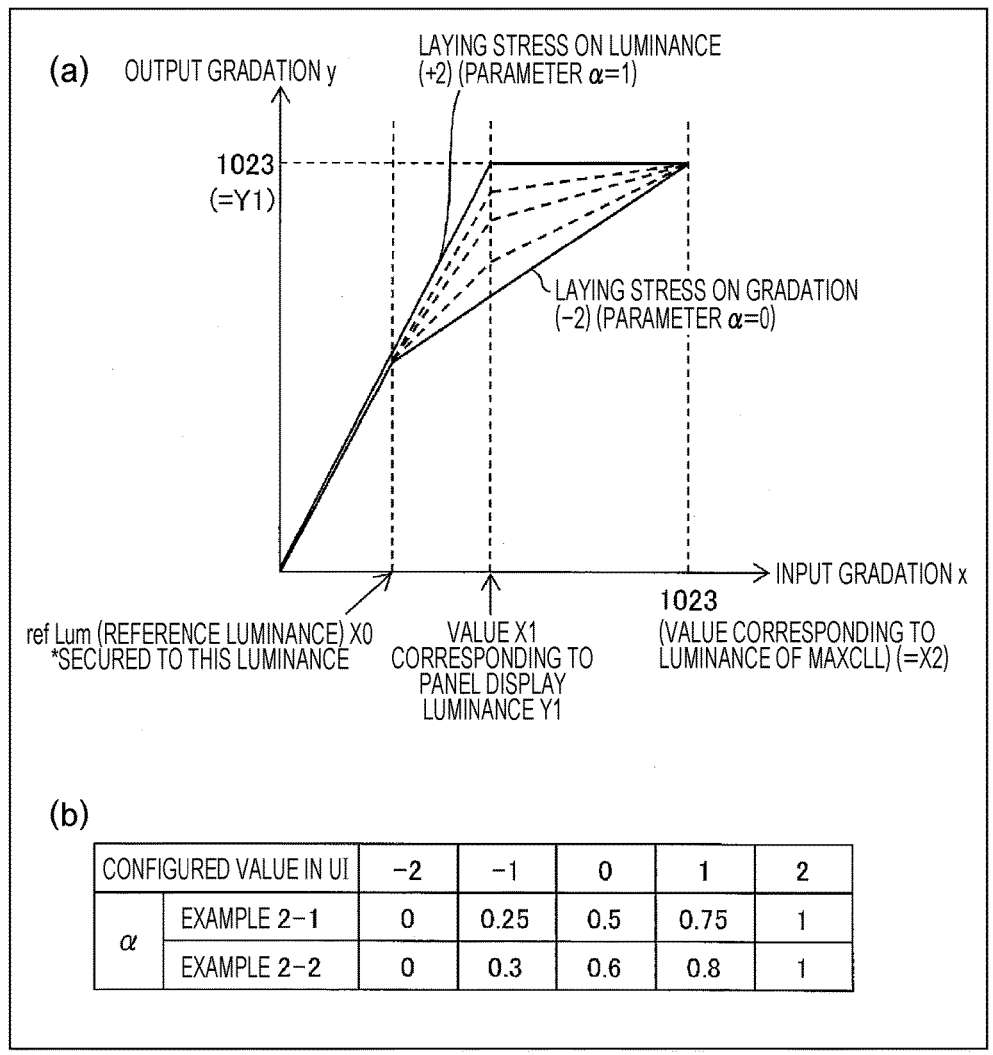

FIG. 9(*a*) shows an example of tone curves when conversion is performed in accordance with the formula. Note that the value of $\alpha$ varies depending on the HDR gamma configuration value received with the user interface described in the fourth embodiment. FIG. 9(*b*) shows the relationship between the HDR gamma configuration value and the value of $\alpha$.

In FIG. 9(*b*), Example 2-1 and Example 2-2 are shown. In Example 2-1, when the HDR gamma configuration value is "−2", $\alpha$ is "0", when the HDR gamma configuration value is "−1", $\alpha$ is "0.25", . . . Moreover, in Example 2-2, when the HDR gamma configuration value is "−2", $\alpha$ is "0", when the HDR gamma configuration value is "−12", $\alpha$ is "0.3", . . . The same follows hereafter.

As illustrated in FIG. 9(*b*), when the HDR gamma configuration value is "+2", the value of $\alpha$ is "1", and therefore, the tone curve at this time corresponds to the graph shown by laying stress on luminance (+2) (parameter $\alpha$=1) in FIG. 9(*a*). Moreover, when the HDR gamma configuration value is "+1", the value of $\alpha$ is "0.75" (in the case of Example 1-1), and the tone curve at this time corresponds to the uppermost one of the graphs shown in broken lines in FIG. 9(*a*). The same follows hereafter.

[Realization Example by Software]

Control blocks (in particular, the image control unit 20 (the video selecting unit 21, the first image processing unit 22, the second image processing unit 23, the image composition unit 24, the OSD generation unit 25, the superimposed image generation unit 26, and the panel control unit 27) of the display device 1 may be realized by logic circuits (hardware) formed in an integrated circuit (IC chip) or by software by using a Central Processing Unit (CPU).

In the latter case, the display device 1 includes, for example, a CPU which executes a command of a program which is software for realizing various functions, Read Only Memory (ROM) or a storage device (which is referred to as a "recording medium") in which the program and various types of data are stored in a manner readable by a computer (or the CPU), and Random Access Memory (RAM) into which the program is to be loaded. The computer (or the CPU) reads the program from the recording medium and executes the program to achieve the object of present invention. As the recording medium, a non-transitory tangible medium, for example, a tape, disk, card, semiconductor memory, or programmable logic circuit can be used. Moreover, the program may be supplied to the computer via any transmission medium (for example, a communication network or a broadcast wave) which can transmit the program. Note that in the present invention, the program may also be realized in a form of a data signal embodied by electronical transmission and embedded in a carrier wave.

[Summary]

A display device (1) according to a first aspect of the present invention is a display device configured to display an image indicated by an HDR signal and an image indicated by an SDR signal, the display device including: a display panel (10); a panel control unit (27) configured to control the display panel; a first image processing unit (22), wherein the first image processing unit is configured to perform gradation performance conversion of converting, in accordance with a maximum luminance level indicated by an HDR signal input to the first image processing unit, a gradation performance indicated by the HDR signal into a prescribed gradation performance according to the display panel, and the panel control unit is configured to perform gradation value conversion of converting, in accordance with the maximum luminance level indicated by the HDR signal and a maximum luminance displayable by the display panel, a gradation value indicated by the HDR signal after the gradation performance conversion into a gradation value displayable by the display panel.

With this configuration, the gradation performance conversion into a prescribed gradation performance according to the display panel is performed in accordance with the maximum luminance level indicated by the HDR signal, and the gradation value conversion is performed in accordance with the maximum luminance level indicated by the HDR signal and the maximum luminance displayable by the display panel. This enables the HDR signal to have a gradation value compatible with a display panel, and even when the maximum luminance level indicated by the HDR signal is higher than the luminance displayable by the display panel, the display panel is enabled to display an image indicated by the HDR signal at an appropriate gradation value.

A display device according to a second aspect of the present invention referring to the first aspect may include a superimposed image generation unit (26) including a gain adjustment unit configured to change a gradation level of a superimposition target image depending on whether an input signal is the HDR signal or the SDR signal, wherein the superimposed image generation unit may be configured to superimpose the superimposition target image on an image indicated by the HDR signal after the gradation performance conversion by the first image processing unit.

This configuration enables the gradation level of the superimposition target image to be changed depending on whether the input signal is the HDR signal or the SDR signal. Thus, it is possible to prevent that the gradation value of the superimposition target image is too high with respect to the input signal, and the superimposition target image thus results in an image including blown-out highlights and/or to prevent that the gradation value of the superimposition target image is too low with respect to the input signal, and the gradation of the superimposition target image is thus lost.

Examples of the superimposition target image include an On Screen Display (OSD) image. In a case of the OSD image, the OSD image displayed at a luminance corresponding to the HDR signal is too bright and is likely to be an image including blown-out highlights. With this configuration, the gradation value of the OSD image is multiplied by gain to lower the luminance, and thus, even in the case of the OSD image, it is possible to appropriately display the OSD image.

A display device according to a third aspect of the present invention referring to the first or second aspect may include: an image composition unit (24); and a second image processing unit (23) which is different from the first image processing unit, wherein the image composition unit may be configured to combine image signals output from the first image processing unit and the second image processing unit to obtain a combined image signal and output the combined image signal to the panel control unit, and the second image processing unit may be configured to perform inverse conversion of the gradation value conversion on the SDR signal which is input.

When the HDR signal and the SDR signal are input, and the HDR signal and the SDR signal are displayed as is, the display quality of one of the HDR signal and the SDR signal may degrade.

With this configuration, performing the inverse conversion of the gradation value conversion converts the SDR signal which is input into a signal corresponding to the HDR signal. Thus, also when the HDR signal and the SDR signal are input to the display device, the SDR signal input to the display device is converted into a signal corresponding to the HDR signal, and therefore, the SDR signal can be processed as the HDR signal. Thus, also when both the HDR signal and the SDR signal are input to the display device, the display panel can be caused to display the HDR signal and the SDR signal at an appropriate gradation value.

In a display device according to a fourth aspect of the present invention referring to any one of the first to third aspects, the panel control unit may have a prescribed luminance threshold value lower than a maximum luminance displayable by the display panel, and a luminance lower than or equal to the luminance threshold value may be converted into a luminance denoted by a gradation value indicated by the HDR signal.

With this configuration, the luminance lower than or equal to the prescribed luminance threshold value is converted into a luminance indicated by the gradation value, and therefore, for the luminance lower than or equal to the prescribed luminance threshold value, the gradation indicated by the HDR signal can be accurately expressed.

In a display device according to a fifth aspect of the present invention referring to any one of the first to fourth aspects, the first image processing unit may be configured to execute the gradation performance conversion by performing a prescribed computation or by referring to a look-up table.

This configuration enables the gradation performance conversion to be executed by performing the prescribed computation or by referring to the look-up table.

A display device according to a sixth aspect of the present invention referring to any one of the first to fifth aspects may include a storage unit configured to store a plurality of patterns of tone maps denoting a correspondence relationship between the gradation value indicated by the HDR signal and the gradation value displayable by the display panel, wherein the panel control unit may be configured to perform the gradation value conversion with reference to a tone map selected by a user.

With this configuration, the gradation value conversion is executed with reference to the tone map selected by a user, and thus, gradation value conversion desired by the user can be executed. Moreover, when the plurality of tone maps include a tone map showing gradation value conversion with stress laid on the gradation and a tone map showing gradation value conversion with stress laid on the luminance, the gradation value conversion with stress laid on the gradation or the gradation value conversion with stress laid on the luminance can be performed based on selection by a user.

A display device according to a seventh aspect of the present invention referring to the sixth aspect may include a display control unit configured to display a user interface with which a user selects the tone map, wherein the user interface may be configured to receive a selection by a user via a slide bar or a radio button, and the display control unit may be configured to display the user interface when a signal to be displayed is the HDR signal or to change a display form of the user interface depending on whether or not the signal to be displayed is the HDR signal.

With this configuration, the display control unit displays the user interface when a signal to be displayed is the HDR signal or changes the display form of the user interface depending on whether or not the signal to be displayed is the HDR signal. When a signal to be displayed (in other words, an input signal) is the SDR signal, the gradation value conversion is not required. Therefore, according to this configuration, it is possible to display the user interface or to change the user interface to be displayed in a case of the HDR signal which requires the gradation value conversion.

Moreover, this configuration can receive a selection by a user via a slide bar or a radio button, and therefore, intuitive sense of operation can be provided to the user.

In a display device according to an eighth aspect of the present invention referring to any one of the sixth to eighth aspects, the tone map may show, in the display panel, a luminance denoted by a gradation value indicated by the HDR signal, a luminance denoted by a gradation value indicated by the HDR signal up to a luminance displayable by the display panel, or a luminance denoted by the gradation value indicated by the HDR signal up to a prescribed threshold value and a luminance denoted by the gradation value appropriately above the threshold value.

With this configuration, using the tone map enables the display panel to accurately display the gradation indicated by the HDR signal, to accurately display the luminance corresponding to the gradation value indicated by the HDR signal up to a luminance displayable by the display panel, or to accurately display the luminance corresponding to the gradation indicated by the HDR signal up to the prescribed threshold value, and to appropriately display the gradation over the threshold value.

A display device according to a ninth aspect of the present invention is a display device a display device configured to display an image indicated by an HDR signal and an image indicated by an SDR signal, the display device including: a display panel; a panel control unit configured to control the display panel; a plurality of image processing units; and an image composition unit, wherein the image composition unit is configured to combine image signals output from the plurality of image processing units to obtain a combined image signal and output the combined image signal to the panel control unit, an image processing unit of the plurality of image processing units which receives the HDR signal converts the gradation performance indicated by the HDR signal into a prescribed gradation performance according to the display panel and converts the prescribed gradation performance into an SDR signal.

With this configuration, also when the HDR signal and the SDR signal are input to the display device, the HDR signal input to the display device is converted into the SDR signal, and therefore, it is possible to process the HDR signal as the HDR signal. Thus, also when both the HDR signal and the SDR signal are input to the display device, the display panel can be caused to display the HDR signal and the SDR signal at an appropriate gradation value.

A television set according to a tenth aspect of the present invention includes the display device.

This provides an advantage similar to the advantages described above.

A method for controlling a display device according to an eleventh aspect of the present invention is a method for controlling a display device configured to display an image indicated by an HDR signal and an image indicated by an SDR signal, the display device including: a display panel; a panel control unit configured to control the display panel; and a first image processing unit, wherein performing gradation performance conversion by using the first image processing unit to convert, in accordance with a maximum luminance level indicated by an HDR signal input to the first image processing unit, a gradation performance indicated by the HDR signal into a prescribed gradation performance according to the display panel, and performing gradation value conversion by using the panel control unit to convert, in accordance with the maximum luminance level indicated by the HDR signal and a maximum luminance displayable by the display panel, a gradation value indicated by the HDR signal after the gradation performance conversion into a gradation value displayable by the display panel.

This method provides an advantage similar to the advantages of the first aspect described above.

The display device according to each aspect of the present invention may be realized by a computer. In this case, the scope of the present invention includes a control program of the display device which causes a computer to operate as each component (software elements) included in the display device to realize the display device by the computer, and a computer-readable recording medium which stores the control program.

The present invention is not limited to the embodiments described above. Various modifications may be made within the scope of the claims. Embodiments obtained by accordingly combining the techniques disclosed in different embodiments are also within the technical scope of the present invention. Moreover, combining technical means disclosed in the embodiments can provide new technical feature.

REFERENCE SIGNS LIST

1 DISPLAY DEVICE
10 DISPLAY PANEL
11 HDMI SIGNAL
12 TUNER SIGNAL
13 CVBS SIGNAL
20 IMAGE CONTROL UNIT (DISPLAY CONTROL UNIT)
21 VIDEO SELECTING UNIT
22 FIRST IMAGE PROCESSING UNIT
23 SECOND IMAGE PROCESSING UNIT
24 IMAGE COMPOSITION UNIT
25 OSD GENERATION UNIT
26 SUPERIMPOSED IMAGE GENERATION UNIT
27 PANEL CONTROL UNIT
30 STORAGE UNIT
31 COMPUTATION TABLE

The invention claimed is:

1. A display device configured to display an image indicated by an HDR signal and an image indicated by an SDR signal, the display device comprising:
    a display panel;
    a panel control unit configured to control the display panel;
    a first image processing unit configured to perform gradation performance conversion of converting, in accordance with a maximum luminance level indicated by the HDR signal input to the first image processing unit, a gradation performance indicated by the HDR signal into a prescribed gradation performance according to the display panel; and
    a superimposed image generation unit including a gain adjustment unit configured to change a gradation level of a superimposition target image depending on whether an input signal is the HDR signal or the SDR signal, wherein the panel control unit is configured to perform gradation value conversion of converting, in accordance with the maximum luminance level indicated by the HDR signal and a maximum luminance displayable by the display panel, a gradation value indicated by an HDR signal after the gradation performance indicated by the HDR signal is converted into a gradation value displayable by the display panel, and the superimposed image generation unit is configured to superimpose the superimposition target image on an image indicated by the HDR signal after the gradation performance conversion by the first image processing unit.

2. The display device according to claim 1, wherein the panel control unit has a prescribed luminance threshold value lower than the maximum luminance displayable by the display panel, and a luminance lower than or equal to the luminance threshold value is converted into a luminance denoted by the gradation value indicated by the HDR signal.

3. The display device according to claim 1, wherein the first image processing unit is configured to execute the gradation performance conversion by performing a prescribed computation or by referring to a look-up table.

4. A television set comprising:
the display device according to claim 1.

5. A display device configured to display an image indicated by an HDR signal and an image indicated by an SDR signal, the display device comprising:

a display panel;

a panel control unit configured to control the display panel;

a first image processing unit configured to perform gradation performance conversion of converting, in accordance with a maximum luminance level indicated by the HDR signal input to the first image processing unit, a gradation performance indicated by the HDR signal into a prescribed gradation performance according to the display panel;

an image composition unit; and a second image processing unit which is different from the first image processing unit, wherein the panel control unit is configured to perform gradation value conversion of converting, in accordance with the maximum luminance level indicated by the HDR signal and a maximum luminance displayable by the display panel, a gradation value indicated by an HDR signal after the gradation performance indicated by the HDR signal is converted into a gradation value displayable by the display panel, the image composition unit is configured to combine image signals output from the first image processing unit and the second image processing unit to obtain a combined image signal and output the combined image signal to the panel control unit, and the second image processing unit is configured to perform inverse conversion of the gradation value conversion on the SDR signal which is input.

6. A display device configured to display an image indicated by an HDR signal, the display device comprising:

a display panel;

a panel control unit configured to control the display panel; and a storage unit configured to store a plurality of patterns of tone maps denoting a correspondence relationship between a gradation value indicated by the HDR signal and a gradation value displayable by the display panel, wherein the panel control unit is configured to perform gradation value conversion of converting, in accordance with a maximum luminance level indicated by an inputted HDR signal and a maximum luminance displayable by the display panel, the gradation value indicated by the HDR signal after a gradation performance indicated by the inputted HDR signal is converted into the gradation value displayable by the display panel, and the panel control unit is configured to perform the gradation value conversion with reference to a tone map selected by a user.

7. The display device according to claim 6, further comprising:

a display control unit configured to display a user interface with which a user selects the tone map, wherein the user interface is configured to receive a selection by a user via a slide bar or a radio button, and the display control unit is configured to display the user interface when a signal to be displayed is the HDR signal or to change a display form of the user interface depending on whether or not the signal to be displayed is the HDR signal.

8. The display device according to claim 6, wherein the tone map shows, in the display panel, a luminance denoted by the gradation value indicated by the HDR signal, a luminance denoted by the gradation value indicated by the HDR signal up to a luminance displayable by the display panel, or a luminance denoted by the gradation value indicated by the HDR signal up to a prescribed threshold value and a luminance denoted by the gradation value appropriately above the threshold value.

9. A display device configured to display an image indicated by an HDR signal and an image indicated by an SDR signal, the display device comprising:

a display panel;

a panel control unit configured to control the display panel;

a plurality of image processing units;

an image composition unit; and a storage unit configured to store a plurality of patterns of tone maps denoting a correspondence relationship between a gradation value indicated by the HDR signal and a gradation value displayable by the display panel, wherein the image composition unit is configured to combine image signals output from the plurality of image processing units to obtain a combined image signal and output the combined image signal to the panel control unit, an image processing unit of the plurality of image processing units which receives the HDR signal converts a gradation performance indicated by the HDR signal into a prescribed gradation performance according to the display panel and converts the prescribed gradation performance into an SDR signal, and the panel control unit is configured to perform gradation value conversion with reference to a tone map selected by a user.

10. A display device configured to display an image indicated by an HDR signal and an image indicated by an SDR signal, the display device comprising:
- a display panel;
- a panel control unit configured to control the display panel;
- a plurality of image processing units;
- an image composition unit; and
- a superimposed image generation unit including a gain adjustment unit configured to change a gradation level of a superimposition target image depending on whether an input signal is the HDR signal or the SDR signal, wherein the image composition unit is configured to combine image signals output from the plurality of image processing units to obtain a combined image signal and output the combined image signal to the panel control unit, an image processing unit of the plurality of image processing units which receives the HDR signal converts a gradation performance indicated by the HDR signal into a prescribed gradation performance according to the display panel and converts the prescribed gradation performance into an SDR signal, and the superimposed image generation unit is configured to superimpose the superimposition target image on an image indicated by the HDR signal after gradation performance conversion by the image processing unit.

11. A method for controlling a display device configured to display an image indicated by an HDR signal and an image indicated by an SDR signal, the display device including a display panel; and a panel control unit configured to control the display panel, the method comprising:

performing gradation value conversion by using the panel control unit to convert, in accordance with a maximum luminance level indicated by an inputted HDR signal and a maximum luminance displayable by the display panel, a gradation value indicated by an HDR signal after a gradation performance indicated by the inputted HDR signal is converted into a gradation value displayable by the display panel;

a first image processing step of performing gradation performance conversion of converting, in accordance with the maximum luminance level indicated by the HDR signal input to the first image processing unit, the gradation performance indicated by the HDR signal into a prescribed gradation performance according to the display panel; and a superimposed image generation step of changing a gradation level of a superimposition target image depending on whether an input signal is the HDR signal or the SDR signal, wherein in the superimposed image generation step, the superimposition target image is superimposed on an image indicated by the HDR signal after the gradation performance conversion in the first image processing step.

12. A method for controlling a display device configured to display an image indicated by an HDR signal and an image indicated by an SDR signal, the display device including a display panel; and a panel control unit configured to control the display panel, the method comprising:

performing gradation value conversion by using the panel control unit to convert, in accordance with a maximum luminance level indicated by an inputted HDR signal and a maximum luminance displayable by the display panel, a gradation value indicated by an HDR signal after a gradation performance indicated by the inputted HDR signal is converted into a gradation value displayable by the display panel;

a first image processing step of performing gradation performance conversion of converting, in accordance with the maximum luminance level indicated by the HDR signal input to the first image processing unit, the gradation performance indicated by the HDR signal into a prescribed gradation performance according to the display panel;

a second image processing step which is different from the first image processing step; and an image composition step, wherein in the second image processing step, inverse conversion of the gradation value conversion is performed on the SDR signal which is input, and in the image composition step, image signals output in the first image processing step and the second image processing step are combined to obtain a combined image signal, and the combined image signal is output to the panel control unit.

13. A method for controlling a display device configured to display an image indicated by an HDR signal, the display device including a display panel; a panel control unit configured to control the display panel; and a storage unit configured to store a plurality of patterns of tone maps denoting a correspondence relationship between a gradation value indicated by the HDR signal and a gradation value displayable by the display panel, the method comprising:

performing gradation value conversion by using the panel control unit to convert, in accordance with a maximum luminance level indicated by an inputted HDR signal and a maximum luminance displayable by the display panel, the gradation value indicated by the HDR signal after a gradation performance indicated by the inputted HDR signal is converted into the gradation value displayable by the display panel, wherein the gradation value conversion is performed with reference to a tone map selected by a user.

14. A non-transitory computer-readable recording medium on which a control program is stored, the control program being configured to cause a computer to function as the display device according to claim 1, wherein the control program causes the computer to function as the panel control unit.

* * * * *